US008121021B2

(12) United States Patent
Xia

(10) Patent No.: US 8,121,021 B2
(45) Date of Patent: Feb. 21, 2012

(54) DATA TRANSMISSION METHOD FOR ORTHOGONAL FREQUENCY DIVISION MULTIPLEXING SYSTEM

(75) Inventor: Shuqiang Xia, Guangdong (CN)

(73) Assignee: ZTE Corporation, Guangpong (CN)

( * ) Notice: Subject to any disclaimer, the term of this patent is extended or adjusted under 35 U.S.C. 154(b) by 205 days.

(21) Appl. No.: 12/518,623

(22) PCT Filed: Dec. 15, 2006

(86) PCT No.: PCT/CN2006/003422

§ 371 (c)(1), (2), (4) Date: Jun. 10, 2009

(87) PCT Pub. No.: WO2008/071039

PCT Pub. Date: Jun. 19, 2008

(65) Prior Publication Data

US 2010/0303168 A1 Dec. 2, 2010

(51) Int. Cl.
*H04J 11/00* (2006.01)

(52) U.S. Cl. ........................................ 370/208; 375/295

(58) Field of Classification Search .................. 370/208, 370/290, 432, 474; 375/295
See application file for complete search history.

(56) References Cited

U.S. PATENT DOCUMENTS 5,818,813 A 10/1998 Saito et al.
6,115,354 A 9/2000 Weck
7,885,295 B2 * 2/2011 Frenger ........................ 370/478
2004/0037215 A1 2/2004 Hwang et al.
2007/0189289 A1 * 8/2007 Frederiksen et al. ......... 370/390

FOREIGN PATENT DOCUMENTS

CN 1476189 A 2/2004

OTHER PUBLICATIONS

3GPP TR 25.814, V7.0.0; "Physical Layer Aspects for evolved Universal Terrestrial Radio Access (UTRA) (Release 7)"; Jun. 2006.*
International Search Report for PCT/CN2006/003422 (WO 2008/071039 A1) Issued Sep. 27, 2007.
3GPP TR 25.814 V0.1.2 (Jun. 2005), 3rd Generation Partnership Project; Technical Specification Group Radio Access Network; Physical Layer Aspects for Evolved UTRA (Release 7).

* cited by examiner

*Primary Examiner* — Gary Mui
(74) *Attorney, Agent, or Firm* — Banner & Witcoff, Ltd.

(57) ABSTRACT

A data transmission method for orthogonal frequency division multiplexing system, specifically comprises sending M, which is greater than 1, OFDM symbols included in each data transmission unit with different bandwidth, wherein each data transmission unit with different bandwidth sends two kinds of OFDM symbols with different cyclic prefix lengths: OFDM symbols with the long cyclic prefixes and OFDM symbols with the short cyclic prefixes; and the data transmission units with different bandwidths transmit the identical number of OFDM symbols with the long cyclic prefixes and the identical number of the OFDM symbols with the short cyclic prefixes.

6 Claims, 1 Drawing Sheet

1.25MHz
~
20MHz

DATA TRANSMISSION METHOD FOR ORTHOGONAL FREQUENCY DIVISION MULTIPLEXING SYSTEM

TECHNICAL FIELD

The present invention relates to the field of broadband wireless communication, and more specifically, to a data transmission method for the technical field of orthogonal frequency division multiplexing (OFDM) system.

BACKGROUND

Due to high spectrum efficiency, strong anti-multipath interference capability and low cost, the OFDM technique gains more and more attentions and is recommended as the preferred technique of the broadband wireless communication. In the present OFDM systems, the data transmission method is very important. For a typical OFDM system, a data transmission unit (such as one frame of OFDMA system based on 802.16, or a subframe in LTE OFDM system) has several OFDM symbols, and at the front of each OFDM symbol, there is a cyclic prefix which is usually the repeat of last data segment of the OFDM symbol. With the cyclic prefix, the OFDM system can not only eliminate the inter-symbol interference caused by multiple paths, but also ensure that the carriers are orthogonal with each other to guarantee the spectrum utility efficiency of the OFDM system. Therefore, the setting of the cyclic prefix in the data transmission unit is very important and how to reasonably set the cyclic prefix has profound significance for the OFDM system.

In the current OFDM system, there are two data transmission methods often used to set the cyclic prefix:

One method is: "3GPP, TR25.81, Physical Layer Aspects for Evolved UTRA (release 7)" provides a setting of cyclic prefix in the LTE OFDM system after the W-CDMA system. When a subframe has 7 OFDM symbols, the settings of cyclic prefixes with different system bandwidths are shown in the following table:

TABLE 1 the setting of cyclic prefix in 3GPP, TR25.814

| | Bandwidth | | | | | |
|---|---|---|---|---|---|---|
| | 1.25 MHz | 2.5 MHz | 5 MHz | 10 MHz | 15 MHz | 20 MHz |
| The setting of cyclic prefix | (4.69/9) × 6, (5.21/10) × 1 | (4.69/18) × 5, (4.95/19) × 2 | (4.69/36) × 3, (4.82/37) × 4 | (4.75/73) × 6, (4.82/74) × 1 | (4.73/109) × 2, (4.77/110) × 5 | (4.75/146) × 5, (4.79/147) × 2 |

Taking the setting of cyclic prefix with the bandwidth of 5 MHz in Table 1 as an example, "(4.69/36)×3, (4.82/37)×4" means that in one subframe, the cyclic prefix of 3 OFDM symbols is 4.69 us, corresponding to 36 sampling points; the cyclic prefix of 4 OFDM symbols is 4.82 us, corresponding to 37 sampling points. In the same way, the settings of cyclic prefixes with other bandwidths can be obtained.

The disadvantage of the above method is: from Table 1, it can be seen that each bandwidth corresponds to a setting of cyclic prefix, and the cyclic prefixes of different bandwidths are not compatible, which increase the complexity of system implementation but without any extra gain. Moreover, from Table 1, it also can be seen that 6 system bandwidths have 8 cyclic prefix lengths: 4.69, 5.21, 4.95, 4.82, 4.75, 4.73, 4.77 and 4.79 us, and since it is quite practical that the users with different bandwidths need to communicate with each other, each user should match with 8 different cyclic prefixes when accessing to the system, thus increasing the time to access to the system and the difficulty of implementation.

For another method, please refer to the OFDM system based on 802.16 standards. However, in the method mentioned in the system, the time lengths of the cyclic prefixes with different bandwidths are the same, and the distinctness that different data should use different cyclic prefixes is not considered. In OFDM communication system, there are two kinds of data sent to the users by the base station (BS): broadcast data and unicast data. The broadcast data means the data, such as the pilot frequency, important system messages, which should be received by all users in the service area of the BS. When the BS sends these messages, it should guarantee that the users in the bad channel environment (for example, those users at the edge of the cell) can correctly receive these important messages, and thus the BS should select OFDM symbols with relatively long cyclic prefix when sending these messages. The unicast message means the data sent to a certain user by the BS, and at this time, the BS should use OFDM symbol with relatively short cyclic prefix to ensure the system's efficiency.

Therefore, in the present OFDM system and standards, the compatibility of the time lengths of the cyclic prefixes with different bandwidths and the distinctness that different data should use different cyclic prefixes are not fully considered when setting the cyclic prefix, or only some aspect is considered while other aspects are neglected. Thus the prior art should be improved.

SUMMARY OF THE INVENTION

The present invention offers a data transmission method for OFDM system to meet the compatibility of the time lengths of cyclic prefixes with different bandwidths and the distinctness that different data should use different cyclic prefixes.

In order to achieve the object of the present invention, the present invention offers a data transmission method for the OFDM system, which specifically comprises sending M, which is greater than 1, OFDM symbols included in each data transmission unit with different bandwidth, wherein each data transmission unit with different bandwidth sends two kinds of OFDM symbols with different cyclic prefix lengths: OFDM symbols with the long cyclic prefixes and OFDM symbols with the short cyclic prefixes; and the data transmission units with different bandwidths transmit the identical number of OFDM symbols with the long cyclic prefixes and the identical number of the OFDM symbols with the short cyclic prefixes.

In the above method, L OFDM symbols with long cyclic prefix are used to transmit the broadcast data in each data transmission unit; M-L OFDM symbols with short cyclic prefix are used to transmit the unicast data; wherein, L=1, 2 . . . M−1.

In the above method, the data transmission units with different bandwidths transmit the OFDM symbols with long cyclic prefix at any same position, such as the first symbol position of different data transmission units.

The method of the present invention offers a data transmission method for OFDM system, which can meet the compatibility requirements of the time lengths of the cyclic prefixes with different bandwidths and the distinctness that different types of data should use different cyclic prefixes, and thus it can facilitate the popularization of the OFDM technique in the field of broadband wireless communication.

PREFERRED EMBODIMENTS OF THE PRESENT INVENTION

Figure 1:
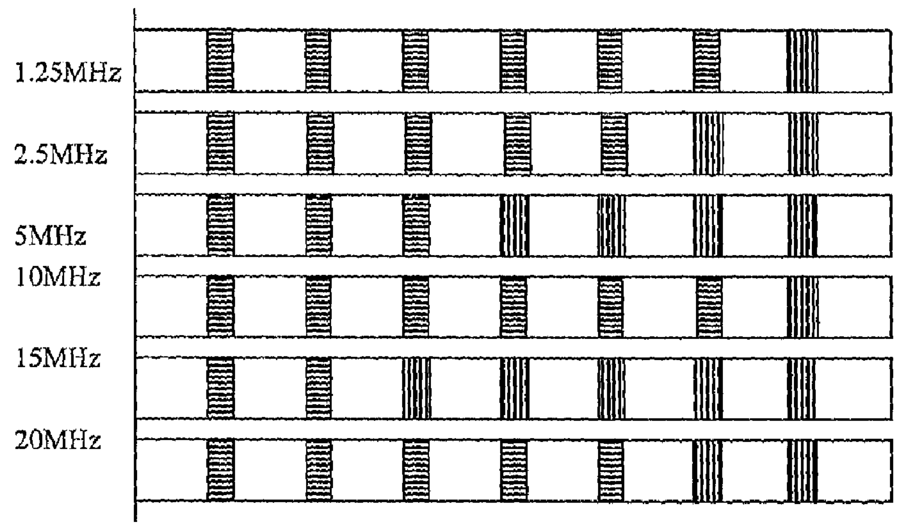
FIG. 1 illustrates the present setting of cyclic prefix in "3GPP, TR25.814"

FIG. 1 vividly shows the settings of cyclic prefixes with different bandwidths based on the setting of cyclic prefix in "3GPP, TR25.814" in Table 1. Wherein, the vertical line block indicates the OFDM symbols with the long cyclic prefixes in the subframe; and the cross line block indicates the OFDM symbols with short cyclic prefix in the subframe. From FIG. 1, it can be seen that, in each channel bandwidth, there are two symbols with different cyclic prefix lengths in each subframe, and in the subframes with different bandwidths, the number of the OFDM symbols with the long cyclic prefixes (or short cyclic prefix) is not the same. The time lengths of the long cyclic prefix and the short cyclic prefix are also variable. As above mentioned, the incompatibility of the cyclic prefix lengths will cause big trouble for the system implementation and user's access.

In the following, an embodiment of the present invention will be described on the basis of the OFDM system described in 3GPP, TR25.814.

In the OFDM system described in 3GPP, TR25.814, the sampling frequencies and the number of FFT points of different bandwidths are compatible with each other, as shown in Table 2:

TABLE 2

The setting of basic parameters in 3GPP, TR25.814

| Bandwidth (MHz) | The number of FFT points | Sampling frequency (MHz) | Sampling interval (us) |
|---|---|---|---|
| 1.25 | 128 | 1.92 | 1/1.92 |
| 2.5 | 256 | 3.84 | 1/3.84 |
| 5 | 512 | 7.68 | 1/7.68 |
| 10 | 1024 | 15.36 | 1/15.35 |
| 15 | 1536 | 23.04 | 1/23.04 |
| 20 | 2048 | 30.72 | 1/30.72 |

In the OFDM system described in 3GPP, TR25.814, the length of a subframe is 0.5 ms. Take the number of OFDMA included in a subframe being 7 for example, we set two kinds of cyclic prefix lengths: the length of the long cyclic prefix is (10/1.92) us, and that of the short cyclic prefix (9/1.92) us. When setting the length of the cyclic prefix, the following two factors should be considered: (a). the target application environment of the system, for different application environments, the required lengths of the cyclic prefixes are not the same. For example, for a typical mobile communication system, a preferred length of the cyclic prefix is generally in the range of 4~6 us; (b). the lengths of the two cyclic prefixes should be integer multiples of the sampling interval corresponding to the lowest bandwidth of the system. How to select the right length belongs to the prior art and will not be discussed here.

And set L=1, that is, in a subframe, one OFDM symbol uses the cyclic prefix with a long time length while the other 6 OFDM symbols use the cyclic prefix with a short time length. It is relatively random when selecting the value of L, although it is certainly better if the average proportion of the broadcast data in the whole data transmitted by the data transmission unit is considered. For example, when the average proportion of the broadcast data in the whole data transmitted by the data transmission unit is not greater than 1/M, L=1 is fine.

When setting the lengths and the number of the cyclic prefixes, the following method can be applied. Suppose the duration of a data transmission unit is $T_D$, the time length of the OFDM symbols after removing the cyclic prefix is $T_S$, the time length of the long cyclic prefix is $T_A$ and the time length of the short cyclic prefix is $T_B$, then the values of $T_A$, $T_B$ and L should meet the following condition: $M \times T_s + L \times T_A + (M-L) \times T_B = T_D$.

According to the above method, the following table provides the cyclic prefix in the OFDM system described in 3GPP, TR25.814 after using the method of the present invention:

TABLE 3 the setting of cyclic prefix in 3GPP, TR25.814 in accordance with the present invention

| | Bandwidth | | | | | |
|---|---|---|---|---|---|---|
| | 1.25 MHz | 2.5 MHz | 5 MHz | 10 MHz | 15 MHz | 20 MHz |
| The setting of cyclic prefix | (4.69/9) × 6, (5.21/10) × 1 | (4.69/18) × 6, (5.21/20) × 1 | (4.69/36) × 6, (5.21/40) × 1 | (4.69/72) × 6, (5.21/80) × 1 | (4.69/108) × 6, (5.21/120) × 1 | (4.69/144) × 6, (5.21/160) × 1 |

Figure 2:
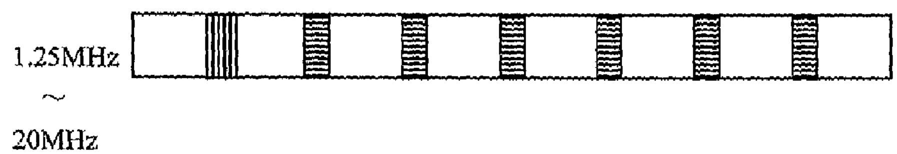
FIG. 2 illustrates an embodiment of setting cyclic prefix in "3GPP, TR25.814" in accordance with the present invention.

FIG. 2 illustrates the setting of cyclic prefix in 3GPP, TR25.814 after applying the method of the present invention. From FIG. 2 and Table 3, it can be seen that each bandwidth defines two kinds of cyclic prefix lengths, and different bandwidths have the same two cyclic prefix lengths. This setting has considered not only the compatibility of the time lengths of the cyclic prefixes with different bandwidths, but also the distinctness that different data should use different cyclic prefixes, and thus has the advantages of simplified implementation and reduced user access time.

It should be mentioned that, suppose the position of the OFDM symbol with a long cyclic prefix in the subframe is constant, for example, specifying that the first symbol in the subframe is an OFDM symbol with long cyclic prefix can increase the speed and accuracy of system synchronization. Of course, the other positions of OFDM symbols with the long cyclic prefixes in the subframe can be specified, and after the positions of the OFDM symbols with the long cyclic prefixes are determined, so are the positions of the OFDM symbols with the short cyclic prefixes.

It should be understood by those skilled in the field that the preferred embodiment of the present invention is not intended to limit the scope of the present invention. Thus, without departing from the spirit and essence of the present invention, all kinds of equivalent modifications or variations should fall into the scope of the claims of the present invention.

INDUSTRIAL APPLICABILITY

The method of the present invention offers a data transmission method for OFDM system, which can meet the compatibility requirements of the time lengths of the cyclic prefixes with different bandwidths and the distinctness that different data should use different cyclic prefixes, and thus is good for the popularization of the OFDM technique in the field of broadband wireless communication.

I claim:

1. A data transmission method for an orthogonal frequency division multiplexing system, comprising sending M, which is greater than 1, orthogonal frequency division multiplexing symbols included in each of data transmission units with different bandwidths, wherein, each of the data transmission units with different bandwidths sends two kinds of orthogonal frequency division multiplexing symbols with different cyclic prefix lengths: orthogonal frequency division multiplexing symbols with long cyclic prefixes and orthogonal frequency division multiplexing symbols with short cyclic prefixes, which are transmitted in the same sub-carrier; and the data transmission units with different bandwidths transmit an identical number of orthogonal frequency division multiplexing symbols with the long cyclic prefixes and an identical number of the orthogonal frequency division multiplexing symbols with the short cyclic prefixes; and wherein, the data transmission units with different bandwidths transmit the orthogonal frequency division multiplexing symbols with the long cyclic prefix at a first symbol position.

2. A method of claim 1, wherein, in each data transmission unit, L orthogonal frequency division multiplexing symbols with the long cyclic prefixes are used to transmit broadcast data, and M-L orthogonal frequency division multiplexing symbols with the short cyclic prefixes are used to transmit unicast data; wherein, L equals to 1, 2 . . . M−1.

3. A method of claim 2, wherein, the system sends L orthogonal frequency division multiplexing symbols with the long cyclic prefixes according to an average proportion of the broadcast data in the whole data sent by the data transmission unit.

4. A method of claim 2, wherein, the data transmission units with different bandwidths transmit the orthogonal frequency division multiplexing symbols with the long cyclic prefixes at any same position.

5. A method of claim 3, wherein, the data transmission units with different bandwidths transmit the orthogonal frequency division multiplexing symbols with the long cyclic prefix at a first symbol position.

6. A method of claim 5, wherein, in an orthogonal frequency division multiplexing system described in 3GPP, TR25.814, one orthogonal frequency division multiplexing symbol with a long cyclic prefix length being (10/1.92) us and 6 orthogonal frequency division multiplexing symbols with a short cyclic prefix length being (9/1.92) us are transmitted in each data transmission unit.

* * * * *

UNITED STATES PATENT AND TRADEMARK OFFICE

CERTIFICATE OF CORRECTION

PATENT NO. : 8,121,021 B2
APPLICATION NO. : 12/518623
DATED : February 21, 2012
INVENTOR(S) : Shuqiang Xia It is certified that error appears in the above-identified patent and that said Letters Patent is hereby corrected as shown below:

On the Title page, item (73),

Delete “Guangpong” and insert -- Guangdong --

Signed and Sealed this
Tenth Day of July, 2012

David J. Kappos
*Director of the United States Patent and Trademark Office*